P. H. CHERRY.
GRAIN-SCALE.
No. 187,813.                    Patented Feb. 27, 1877.
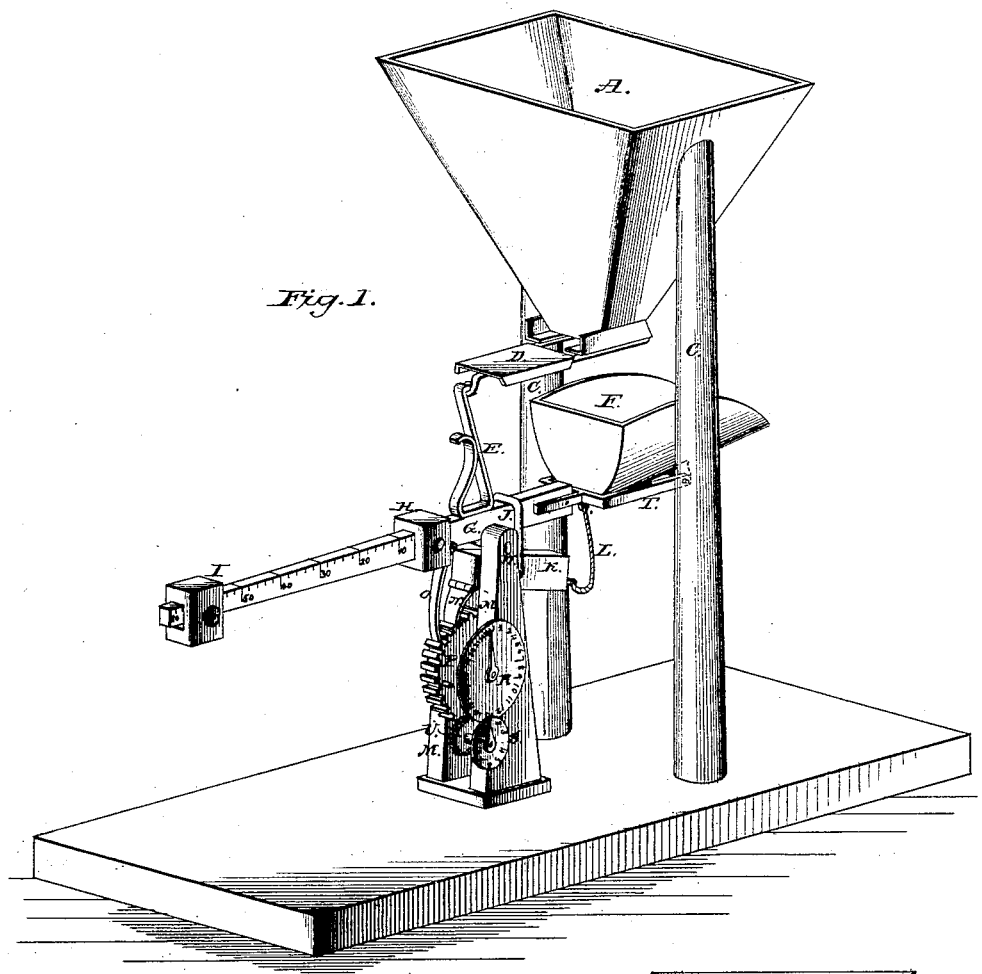
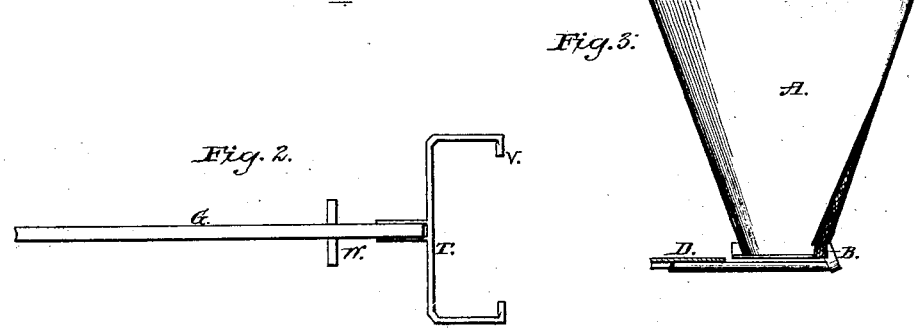
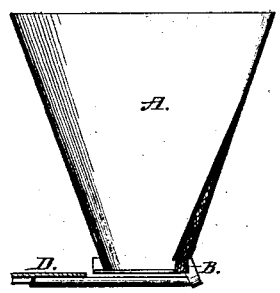
Attest:
I. S. Jones
E. H. Keck
Inventor:
P. H. Cherry

UNITED STATES PATENT OFFICE.

PETERSON H. CHERRY, OF PARSONS, KANSAS.

IMPROVEMENT IN GRAIN-SCALES.

Specification forming part of Letters Patent No. 187,813, dated February 27, 1877; application filed June 23, 1876.

*To all whom it may concern:*

Be it known that I, PETERSON H. CHERRY, of the city of Parsons, in the county of Labette and State of Kansas, have invented a new and useful Machine for Weighing and Registering the Weight of Grain and other Articles; and I do hereby declare that the following is a full, clear, and exact description of the construction and operation of the same, reference being had to the annexed drawings, making a part of this specification, in which—

Figure 1 is a perspective view of the grain scale and register. Fig. 2 is a longitudinal view. Fig. 3 shows the hopper A, which receives the grain preparatory to being weighed.

A is the hopper or conducting-pipe, which contains the grain or other articles, and from which the grain, &c., pass through an aperture in the bottom into the receiving vessel F, to be weighed. B are two rods fastened to the bottom of the hopper, one on each side of the aperture, for the purpose of connecting slide D with the hopper, and on which the slide moves. C C are two pillars supporting the hopper. D is the slide which closes the aperture in the bottom of the hopper when the receiving-vessel discharges its grain, and then returns to its former position, opening said aperture. E is an arm connected firmly to the upper side of the scale-beam G and over the pivot, and attached to slide D above, so as to govern the movements of the slide in opening and closing the aperture in the hopper. F is the vessel or scoop, resting, by means of the arms T, on the large end of the scale-beam, extending back under the hopper, from which it is filled, and when the weight balances the weight on the other end of the scale-beam, it dips and turns on a pivot attached to the ends of the arms T and discharges its load. As the other end of the scale-beam ascends, the slide D is forced back, closing the aperture in the bottom of the hopper, so that no grain escapes while vessel F discharges, after which weight I carries vessel F back, withdraws the slide D, and the vessel is again filled, the grain weighed, discharged, the weight registered, &c. G is the scale-beam; H, the movable balance, fastened with thumbscrew; I, the weight, fastened with thumbscrew in the scale-beam. J is a bar fastened to K, and bent over the scale-beam to keep it in place. K is a bumper to stop the downward motion of scale-beam. L is a strap, cord, or chain fastened to K, and attached to F as a check. M M are pillars on which the machinery rests. N is a stop to prevent the ratchet-wheel P from turning backward. O is a ratchet attached to the under side of the scale-beam, so that as the beam returns horizontally, after the vessel F discharges, it turns the ratchet-wheel one ratchet. P is the ratchet-wheel between and supported by the pillars M M, and to which the registering-hand of the dial R is attached, and moves as the wheel moves, thus registering the quantity of grain weighed or the number of times vessel F discharges. R is the register or dial which records the number of pounds or bushels weighed and discharged. S is a register or dial, and records each revolution of the hand of dial R. T represents the arms attached to the large end of the scale-beam, and which extend back and out on both sides of vessel F, supporting it. U is a small cog-wheel, arranged so that when the ratchet-wheel P makes a revolution a small ratchet in the ratchet-wheel strikes a cog and turns the wheel, which causes the hand of dial S to revolve from figure to figure, thus registering the number of revolutions made by the hand of dial R, and the aggregate pounds or bushels weighed. W is the pivot of the scale-beam G, and rests on pillars M M.

I claim as my invention—

In a grain-register, the combination of scale-beam G, hopper A, and vessel F with ratchet-wheel P, cog-wheel U, and dials R and S, substantially as and for the purposes set forth.

PETERSON H. CHERRY.

Witnesses:
J. L. JONES,
A. B. HACKER.